May 7, 1963 A. G. SCHILBERG 3,088,750
BULKHEAD REINFORCED OFFSET FRAME
Filed April 5, 1961
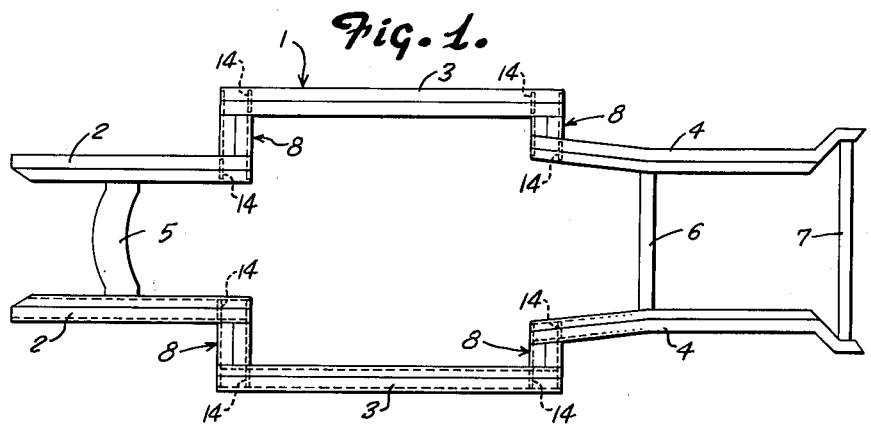
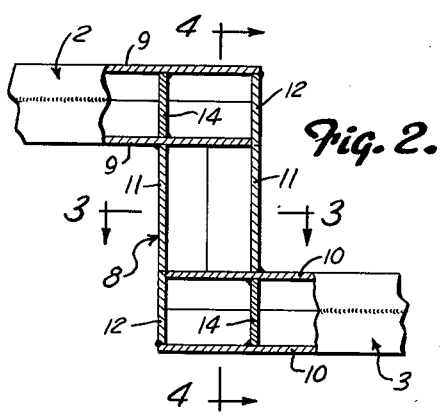
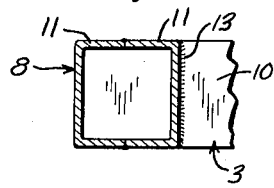
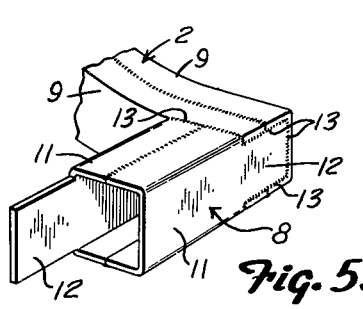
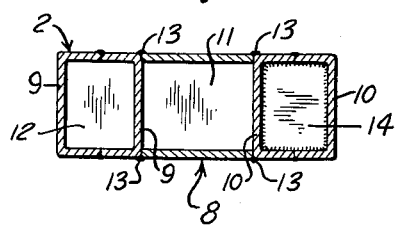
INVENTOR.
ARNOLD G. SCHILBERG, DECEASED.
BY IRENE G. SCHILBERG, ADMINISTRATRIX.
BY
Andrus & Starke
Attorneys

United States Patent Office 3,088,750
Patented May 7, 1963

3,088,750
BULKHEAD REINFORCED OFFSET FRAME
Arnold G. Schilberg, deceased, late of Milwaukee, Wis., by Irene G. Schilberg, special administratrix, Milwaukee, Wis., assignor to A. O. Smith Corporation, Milwaukee, Wis., a corporation of New York
Filed Apr. 5, 1961, Ser. No. 102,087
1 Claim. (Cl. 280—106)

The present invention relates generally to offset automobile frames and particularly to frames of this type having bulkhead reinforced side rails.

The offset or wide hipped frame as it is sometimes called has been developed for use with vehicles having a low silhouette primarily as a means of providing more adequate passenger seating space in the vehicle. To this end, the frame was built up of separate, fore, aft and center sections with the center section side rails disposed in outwardly offset relation with the corresponding side rails of the fore and aft frame sections and immediately inboard or under the side sills of the separate body structure. The several frame sections were interconnected through torque boxes located between adjacent ends of coresponding side rails. The area between the center side rails was left free of cross braces to allow a complete dropping of the underbody within the frame to or near the level of minimum ground clearance.

This type of frame was of further advantage in that it permitted vertical or near vertical attachments between the center frame section side rails and the main structural members of the body. Previously, body and frame were mounted eccentrically of one another through long overhanging body brackets or outriggers, an arrangement which prevented effective mutual reinforcement between body and frame and gave rise to substantial twisting forces in the vehicle.

The above discussed advantages stemming from the offset frame design were acheived at the sacrifice of structural efficiency within the frame itself, however. On the one hand, the torque boxes acted as crank arms for vertical frame loads and, to effectively withstand the resultant twisting forces, the frame had to be constructed of heavier gauge material. Frame cost and weight were thus relatively high.

Further, the physical relation of the various frame components made it possible to effectively connect the torque box to the adjoining or near wall only of the side rails. In some cases, opposite sides of the torque box rails were extended across the end of the side rails and attached to the far wall also of the side rails. In any event, however, there was an unequal stabilization of the side rails by the torque boxes and it was found that when subjected to vertical loads, opposite side portions of the side rails deflected unequally and caused a secondary twisting action within the loaded rail. The frame rails thus had to be correspondingly stiffened to resist these objectionable secondary forces.

In the present invention, the interconnecting ends of each of the fore, aft, and center side rails are enclosed by the extended sides of the torque box and are provided with an internal bulkhead located in alignment with the side of the torque box attached to the near wall only of the particular rail in question. Besides increasing the overall rigidity of the rails both in bend and torsion, these bulkheads, because of their position with respect to the torque box, provide a more uniform deflection between opposite sides of the side rails, thus reducing the referred to secondary twisting forces in the rail.

The provision of the bulkheads permits the frame rails to be fabricated of lighter gauge material, making possible a lighter, less costly frame structure. These bulkheads may be conveniently incorporated within the rails as the latter are being assembled so as to minimize assembly time and costs attributable to the use of such bulkheads.

The drawing furnished herewith illustrates the best mode presently contemplated of carrying out the invention.

In the drawing:

FIG. 1 is a top plan of an offset frame embodying the present invention;

FIG. 2 is an enlarged fragmentary view of FIG. 1 showing the construction employed between adjoining connecting side rails with parts broken away and others sectioned for sake of clarity;

FIG. 3 is a section along the lines 3—3 of FIG. 2;

FIG. 4 is a section along the lines 4—4 of FIG. 2 showing the cross-sectional shape of the side rails and the manner in which the torque box and bulkhead interfit with the side rails; and FIG. 5 is a perspective of one of the torque boxes employed in the frame of the invention shown with a side rail mounted on one end only of the box.

The offset frame 1 embodying the present invention includes a series of pairs of separate and distinct tubular side rails consisting of the fore side rails 2, center side rails 3 and aft side rails 4. Each of the rails 2 and 4 is joined directly to its companion rail in spaced, parallel relation by transversely extending frame members herein shown as a front cross brace assembly 5, a rear shock bar 6, and a rear cross bar 7. The center side rails 3 are connected to the corresponding rails 2 and 4 in laterally outwardly offset, longitudinally overlapping relation by the torque boxes 8 to provide a rigid frame structure having relatively narrow end portions and a wide, hipped center portion.

The construction of the frame in the general area of each of the four torque boxes is identical in all respects and thus only one such area need be considered therein. Referring to FIGS. 2–5 which represent the frame construction in the area of the front, lefthand or lower torque box of FIG. 1, the fore side rails 2 are shown as comprising a pair of channel members 9 and the center side rails 3 of the channels 10. Each pair of the channels 9 and 10 is butt welded together in facing relation to provide a boxed rail construction.

The torque box is similarly constructed of a pair of relatively short or stub channel-like members 11, these members being assembled endwise between the rails 2 and 3 in abutting relation with the adjoining or near wall of the rails. In the illustrated construction, the channels 9 and 10 and members 11 are shown as all having an equal depth so as to provide a flush fit with a maximum amount of edge contact between the various assembled members.

To provide a stronger, more intimate attachment into the side rails along with increased side rail stabilization, each member 11 is extended outwardly along one side and oppositely of the other member to provide an integral end piece 12 at either end of the torque box. These end pieces 12 constitute closures for the ends of the rails 2 and 3 and are preferably extended through suitable notches in the rails 2 and 3 to abut internally against the far wall of the corresponding side rails.

Side rails 2 and 3 and torque box 8 are secured in the above relation by a series of welds 13 laid along the periphery of torque box 8 and the contiguous portions of the rails. In the case of end pieces 12, the weld is laid within and immediately adjacent the extreme end portion of rails 2 and 3 in the manner shown in FIG. 5.

In the construction described, it will be noted that the near side portion of each of the rails relative to the torque box is embraced by the full width of the box whereas the far side portion of the rails is effectively supported only along one edge of the torque box through the end pieces 12. The opposite portions of the rails will as a result tend to deflect unequally when the rail is loaded vertically and give rise to a secondary twisting force within the rail proper.

In order to counter this effect, the adjoining, interconnected ends of each of rails 2 and 3 are provided with a sheet metal bulkhead 14 secured within the rail a distance corresponding to the width of torque box 8 and thus in direct alignment with the side of the torque box connected to the near wall only of any particular rail. In the overall frame then, there are a total of eight such bulkheads.

The far side portion of the side rails is now supported both by end piece 12 and bulkhead 14 and as the latter is aligned with a corresponding side of the torque box, the opposite side portions of each of the rails are substantially uniformly stabilized over the full area of the torque boxes. A more uniform deflection is thus maintained in the rail and the referred to twisting of the rails under vertical loads effectively eliminated.

The bulkheads are of advantage also in increasing the overall bend and torsional rigidity of the side rails. In actual experiments conducted on a frame having the bulkheads of the invention, it was found that the bulkheads increased side rail rigidity by 6% in torsion and approximately 1% in bend. Additional tests were conducted on the frame, which was modified to include hip cross bars connected across the fore and aft side rails directly in line with the torque boxes. The results obtained then were extrapolated to adjust for the effect of the hip bar itself to determine the gain solely attributable to the bulkheads. In the case of a single hip bar, either located fore or aft, the torsional gain was 10% while the bend gain remained at 1%. The corresponding values for a frame with two hip bars were 17% in torsion and 1% in bend.

Various modes of carrying out the invention are contemplated as being within the scope of the following claim particularly pointing out and distinctly claiming the subject matter which is regarded as the invention.

What is claimed is:

In a vehicle frame, fore and aft pairs of tubular side rails connected intermediate their ends, a center pair of tubular side rails disposed laterally outwardly of said fore and aft side rails in longitudinally overlapping relation with the ends thereof, a torque box disposed endwise between the ends of each of the center side rails and the corresponding adjacent ends of each of the fore and aft side rails, each torque box including diametrically opposed, extended side portions enclosing the ends of the center side rails and the ends of the corresponding fore and aft pairs of side rails, means for securing each of the torque boxes to the ends of the center side rails and to the ends of the corresponding fore and aft pairs of side rails including means for securing each torque box to the inner walls of the center side rails and the inner walls of the corresponding fore and aft side rails relative to the torque boxes and to the outer walls of the side rails by way of the diametrically opposed extended side portions of the torque boxes, and a bulkhead secured within each of said fore and aft and center side rails a distance in from the end thereof substantially equal to the width of the torque boxes whereby the deflection in the outer and inner walls of each of the fore, aft and center side rails is equalized in the regions of the torque boxes under torsional and vertical loading.

References Cited in the file of this patent

UNITED STATES PATENTS

| | | |
|---|---|---|
| 1,462,617 | Ohnstrand | July 24, 1923 |
| 2,141,635 | Almdale | Dec. 27, 1938 |
| 2,246,245 | Eckart | June 17, 1941 |
| 2,747,887 | Schilberg | May 29, 1956 |
| 2,964,331 | Sherman | Dec. 13, 1960 |